United States Patent [19]
Petisce

[11] Patent Number: 5,812,725
[45] Date of Patent: Sep. 22, 1998

[54] METHOD FOR INCREASING ADHESION BETWEEN A COATING AND AN OPTICAL GLASS FIBER ELECTRON BEAM PRETREATMENT

[75] Inventor: James R. Petisce, West Dundee, Ill.

[73] Assignee: DSM N.V., Heerlen, Netherlands

[21] Appl. No.: 826,388

[22] Filed: Apr. 9, 1997

Related U.S. Application Data

[60] Provisional application No. 60/015,101, Apr. 10, 1996.

[51] Int. Cl.$^6$ .............................. G02B 6/16; C03B 37/01; B05D 5/06
[52] U.S. Cl. .......................... 385/128; 385/144; 385/141; 427/163.2; 65/529; 65/533; 65/430; 65/435; 65/441
[58] Field of Search ..................................... 385/128, 123, 385/144, 141; 427/162–165; 65/376, 529, 60.1, 633, 430, 435, 441

[56] References Cited

U.S. PATENT DOCUMENTS

| | | | |
|---|---|---|---|
| 4,169,167 | 9/1979 | McDowell | 427/54 |
| 4,472,019 | 9/1984 | Bishop | 385/128 |
| 4,849,462 | 7/1989 | Bishop | 522/97 |
| 4,932,750 | 6/1990 | Ansel | 385/141 |
| 4,962,992 | 10/1990 | Chapin | 385/102 |
| 5,136,679 | 8/1992 | Broer et al. | 385/128 |
| 5,171,634 | 12/1992 | Soszka et al. | 428/376 |
| 5,373,578 | 12/1994 | Parker et al. | 385/128 |
| 5,427,862 | 6/1995 | Ngo et al. | 428/435 |
| 5,723,191 | 3/1998 | Plamhottam et al. | 428/41.8 |

FOREIGN PATENT DOCUMENTS

| | | |
|---|---|---|
| 60-090853 A | 5/1985 | Japan. |
| 60-204641 A | 10/1985 | Japan. |
| 2 155 357 | 9/1985 | United Kingdom. |

OTHER PUBLICATIONS

Y.V. Dudko et al., Electron Beam Modification of Silicate Glass Surfaces, Journal of Non–Crystalline Solids, vol. 188, No. 1–2, Jul. 1995, pp. 87–92.

*Primary Examiner*—John D. Lee
*Assistant Examiner*—Ellen E. Kang
*Attorney, Agent, or Firm*—Pillsbury Madison & Sutro LLP

[57] ABSTRACT

This invention provides a method of increasing adhesion of radiation-cured, inner primary coatings on glass optical fibers. A glass optical fiber drawing tower has a controllable variable amperage electron beam for exposing different sections of a glass optical fiber with different amperage levels of electron beam radiation. The different sections of the glass optical fiber after being exposed to the selected amperage levels of electron beam radiation are then coated with an inner primary coating composition which is finally cured by exposure to actinic radiation. Later formed sections of the same glass optical fiber can be exposed to different amperage levels of electron beam radiation and then coated and cured. The different sections of the glass optical fiber which have been coated with an inner primary coating using this method demonstrate correspondingly different degrees of coating adhesion. Reduced levels of adhesion promoter are required for inner primary coating compositions when using this method.

58 Claims, 1 Drawing Sheet

FIG. 1

METHOD FOR INCREASING ADHESION BETWEEN A COATING AND AN OPTICAL GLASS FIBER ELECTRON BEAM PRETREATMENT

CROSS-REFERENCE TO RELATED APPLICATION

This Application claims priority from Provisional Application Ser. No. 60/015,101, filed on Apr. 10, 1996.

BACKGROUND OF THE INVENTION

1. Field of the Invention

This invention relates to a method of increasing the adhesion of radiation-cured coatings on glass optical fibers by pre-treating the fiber with electron-beam exposure.

2. Description of Related Art

Optical glass fibers are frequently coated with two or more superposed radiation-curable coatings which together form a primary coating immediately after the glass fiber is produced by drawing in a furnace. The coating which directly contacts the optical glass fiber is called the "inner primary coating" and an overlaying coating is called the "outer primary coating." In older references, the inner primary coating was often called simply the "primary coating" and outer primary coating was called a "secondary coating," but for reasons of clarity, that terminology has been abandoned by the industry in recent years. Inner primary coatings are softer than outer primary coatings. Matrix materials can be used to bind a plurality of coated fibers in a ribbon structure.

Single-layered coatings ("single coatings") can also be used to coat optical fibers. Single coatings generally have properties (e.g., hardness) which are intermediate to the properties of the softer inner primary and harder outer primary coatings.

The soft inner primary coating provides resistance to microbending which results in attenuation of the signal transmission capability of the coated optical glass fiber and is therefore undesirable. The harder outer primary coating provides resistance to handling forces such as those encountered when the coated fiber is ribboned and/or cabled.

Optical fiber coating compositions, whether they be inner primary or single coatings, generally comprise before cure a polyethylenically-unsaturated monomer or oligomer dissolved or dispersed in a liquid ethylenically-unsaturated medium and a photoinitiator. The coating composition is typically applied to the optical glass fiber in liquid form and then exposed to actinic radiation to effect cure.

Exposure to moisture can be devastating to coated optical fibers. In addition to causing the weakening of the optical glass fibers, moisture can also cause the inner primary or single coating layer to delaminate from the optical glass fiber. Delamination from the optical glass fiber usually results in a weakened optical glass fiber, because the delaminated coating can slide against the optical glass fiber causing microscopic scratches in the surface of the optical glass fiber. The microscopic scratches can be crack initiation points where cracks in the optical glass fiber can form thereby weakening the optical glass fiber. Furthermore, if the delamination of the coating is periodic, high transmission loss could be induced.

To reduce delamination of the inner primary or single coating, adhesion promoting additives have been incorporated into coating compositions which contact the glass fiber. Coatings without adhesion promoter may generally be easily removed from glass optical fibers after exposure to high humidity.

Silane adhesion promoters are particularly useful. For example, compounds containing the following structures have been successfully utilized as adhesion promoters in inner primary and single coating compositions:

Several reactions may result in adhesion promotion. For example, it is believed that the trimethoxysilyl group, —Si(OCH$_3$)$_3$, may react with the surface of the optical glass fiber by the following reaction:

A methacrylate or mercapto group present in "R" of the adhesion promoter molecule may react with the inner primary coating during free radical polymerization, upon exposure to actinic radiation, through formation of a free radical entity as follows:

Similarly

Essentially, it is believed that the adhesion promoter molecule functions to "link" or "couple" the glass surface and the cured inner primary coating: one end of the adhesion promoter having reacted with the glass surface and the other end of the adhesion promoter having reacted with the inner primary coating oligomer network. Therefore, the adhesion promoter can also be called a "coupling agent."

Several U.S. patents disclose examples of radiation-curable optical glass fiber coating compositions containing adhesion promoter. For example, U.S. Pat. No. 4,849,462 describes a coating composition comprising a U.V.-curable polyurethane polyacrylate containing about 0.5 to 5.0% by weight of a mercapto polyalkoxysilane.

Despite their success in industry, adhesion promoters can also cause problems. Some adhesion promoters are highly susceptible to impurities and contaminants which may be present in the inner primary coating compositions. For example, acidic impurities, or other impurities such as water or alcohol, can react with the adhesion promoters rendering them unreactive with the optical glass fiber surface. Furthermore, the reaction between the optical glass fiber surface and the adhesion promoter is usually relatively slow. For example, reaction between the silanic groups on the surface of the optical glass fiber and trialkoxy groups on a silane adhesion promoter may in some cases require about 24 hours for the reaction to be completed. Finally, cure speed may decrease when adhesion promoter is present.

There is a long felt need for a solution to the above described instability, unpredictability and slow cure speed problems associated with the use of adhesion promoters in radiation-curable inner primary and single coating compositions. Moreover, for certain applications, it would be very desirable to easily adjust the strength of adhesion between the inner primary coating and the optical glass fiber, without having to use different inner primary coating compositions. Previous to this invention, if different levels of adhesion between the inner primary coating and sections of the optical glass fiber were desired, then different inner primary coating compositions would have to be used for respective sections of the optical glass fiber. This would be difficult to accomplish in practice and is time consuming and costly.

In high strength applications, such as the section of optical glass fiber cables for use under deep oceans, the adhesion strength between the inner primary coating and optical glass fiber must be very high. When retrieving the optical glass fiber cable from a deep seabed, very large material forces are applied to the cable and accordingly transmitted to the individual optical glass fibers contained therein. Especially under these conditions, the adhesion between the inner primary coating and optical glass fiber must be relatively quite high and sufficient to preclude some inner primary coatings from sliding detachment from the optical glass fibers under these stresses.

On the other hand, less adhesion between the inner primary coating and the optical glass fiber is desirable at the ends of the cable fibers. It is important to have relatively easy access to the individual optical glass fiber ends with ease of strippability of the inner primary coating from the optical glass fiber.

In such an application, two or more different inner primary, optical glass fiber coating compositions must be used having different levels of adhesion between the inner primary coating and the optical glass fiber.

In ribbon cable applications it is also desirable to provide a low level of adhesion between the inner primary coating and the optical glass fiber so that the inner and outer primary fiber coatings and the matrix material can all be stripped simultaneously from the fiber ends.

Hence, there is also a long felt need for an inexpensive, rapid and facile method for achieving variations in the relative adhesion of the inner primary coating to an optical glass fiber, and which avoids the prior need to use different inner primary coating compositions. Such a method would be very advantageous because only one inner primary coating composition could then be used to permit adjustment of different levels of adhesion over the length of the optical glass fiber.

SUMMARY OF THE INVENTION

An objective of this invention is to provide a solution to the problems associated with the use of adhesion promoters in radiation-curable, inner primary and single coating compositions which directly contact glass optical fiber.

Another objective of this invention is to provide an inexpensive, rapid and facile method for adjusting the level of adhesion bonding between the coating and an optical glass fiber, and which avoids the need to use different coating compositions to achieve different adhesion levels.

The present invention provides a method of increasing the adhesion of a radiation-cured coating contacting an optical glass fiber, the method comprising the combination of steps of:

(1) exposing at least a section of an uncoated optical glass fiber to electron beam radiation to form an electron beam exposed optical glass fiber;

(2) applying a radiation-curable coating composition onto the electron beam exposed optical glass fiber to form a coated optical glass fiber, the coating composition comprising at least one monomer or oligomer having a radiation-curable functional group which can form free radicals in the presence of actinic radiation; and (3) exposing the coated optical glass fiber to actinic radiation to thereby cure the coating.

The present invention also provides a coated optical glass fiber having enhanced bonding of the coating contacting the optical glass fiber comprising:

an electron beam pre-treated optical glass fiber; and a radiation-cured coating contacting the pre-treated optical glass fiber, wherein the radiation-cured coating has been applied to the optical glass fiber in the form of a radiation-curable coating composition and cured by actinic radiation while the radiation-curable coating composition is contacting the optical glass fiber, and wherein the radiation-cured coating exhibits enhanced bonding to the optical glass fiber as a result of exposure of the optical glass fiber to electron beam radiation before the radiation-curable coating composition is applied to the optical glass fiber.

DETAILED DESCRIPTION OF PREFERRED EMBODIMENTS

While not wishing to be bound by the following explanation, it is believed that exposure of an optical glass fiber surface to electron beam radiation according to this invention causes the glass matrix chemical bonds to rupture and form free radicals as shown below:

When a radiation-curable, inner primary coating composition is applied to the surface of the surface treated optical glass fiber containing these free radicals and exposed to actinic radiation, the actinic radiation can generate free radicals in the inner primary coating composition which are believed to react with the free radicals present on the surface of the surface treated optical glass fiber. This may preclude the necessity of using an adhesion promoter in inner primary coating compositions, as discussed more fully below.

Alternatively, the free radicals on the surface of the surface treated optical glass fiber may be capable of reacting directly with any ethylenically unsaturated functional groups, such as acrylate or methacrylate terminal groups, present in the inner primary coating composition.

Inner Primary and Single Coating Compositions

This invention is applicable to radiation-curable, inner primary, optical glass fiber coating compositions (hereinafter "inner primary composition") containing a radiation-curable functional group, and optical glass fibers to which these inner primary compositions are applied. Single coatings can also be used. Exemplary single coatings are disclosed in, for example, U.S. Pat. No. 4,932,750, which is hereby incorporated by reference. Single coatings, like inner primary coatings, generally comprise oligomer, reactive diluent, and optional photoinitiator and additives. Conventional outer primary coatings can be used in the practice of this invention as disclosed in, for example, U.S. Pat. No. 4,472,019, which is hereby incorporated by reference.

Inner primary compositions usually contain one or more radiation-curable oligomers or monomers having at least one functional group capable of polymerization when exposed to actinic radiation, such as UV light. Suitable radiation-curable oligomers or monomers are now well known and within the skill of the art.

Commonly, the radiation-curable functionality used is ethylenic unsaturation, which can be polymerized through free radical polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, or styrene functionality.

Another type of radiation-curable functionality generally used is provided by, for example, thiol-ene or amine-ene systems. The thiol-ene and amine-ene systems are usually polymerized through free radical polymerization. In the thiol-ene and amine-ene systems, for example, polymerization can occur between a group containing allylic unsaturation and a group containing a tertiary amine or thiol.

The free radicals believed to be generated on the surface of the surface treated optical glass fiber may be able to react directly with the radiation-curable functionality present in the inner primary composition, without first generating free radicals in the inner primary composition. However, the coating composition is preferably exposed to actinic radiation to generate free radicals therein. The free radicals generated in the coating composition are believed to react with the free radicals generated on the surface of the surface treated optical glass fiber.

The inner primary compositions may also contain a reactive diluent which can be used to adjust the viscosity of the inner primary composition. The reactive diluent can be a low viscosity monomer containing having at least one functional group capable of polymerization when exposed to actinic radiation. This functional group may be of the same nature as that used in the radiation-curable monomer or oligomer. Preferably, the functional group present in the reactive diluent is capable of copolymerizing with the radiation-curable functional group present on the radiation-curable monomer or oligomer. More preferably, the radiation-curable functional group forms free radicals during curing which can react with the free radicals generated on the surface of the surface treated optical glass fiber.

For example, the reactive diluent can be a monomer or mixture of monomers having an acrylate or vinyl ether functionality and an $C_4$–$C_{20}$ alkyl or polyether moiety. Particular examples of preferred reactive diluents include:
hexylacrylate,
2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone, and the like.

Another type of reactive diluent that can be used is a compound having an aromatic group. Particular examples of reactive diluents having an aromatic group include:
ethyleneglycolphenylether-acrylate,
polyethyleneglycolphenylether acrylate,
polypropyleneglycolphenylether-acrylate, and
alkyl-substituted phenyl derivatives of the above monomers, such as polyethyleneglycolnonylphenyletheracrylate.

The reactive diluent can also comprises a diluent having two or more functional groups capable of polymerization. Particular examples of such monomers include:

$C_2$–$C_{18}$ hydrocarbon-dioldiacrylates,
$C_4$–$C_{18}$ hydrocarbondivinylethers,
$C_3$–$C_{18}$ hydrocarbon triacrylates, and the polyether analogues thereof, and the like, such as 1,6-hexanedioldiacrylate,
trimethylolpropanetriacrylate,
hexanedioldivinylether,
triethylene-glycoldiacrylate,
pentaerythritol-triacrylate,
ethoxylated bisphenol-A diacrylate, and
tripropyleneglycol diacrylate.

If the radiation-curable functional group of the radiation-curable monomer or oligomer has an amine-ene or thiol-ene system, examples of reactive diluents having allylic unsaturation that can be used include:
diallylphthalate,
triallyltri-mellitate,
triallylcyanurate,
triallylisocyanurate, and
diallylisophthalate. For amine-ene systems, amine functional diluents that can be used include, for example:
the adduct of trimethylolpropane,
isophoronediisocyanate and di(m)ethylethanolamine,
the adduct of hexanediol, isophorondiisocyanate and dipropylethanolamine, and
the adduct of trimethylol propane, trimethylhexamethylene-diisocyanate and di(m)ethylethanolamine.

The inner primary compositions also usually contain an adhesion promoter which has glass-binding groups that are capable of bonding to optical glass fiber under the curing conditions for the particular application of the inner primary composition to the optical glass fiber. Such inner primary coating compositions containing adhesion promoters can be used in this invention, but the use of an adhesion promoter may be unnecessary. This invention can provide a bond or "link" between the cured inner primary coating and the surface treated optical glass fiber. Therefore, there may not be a need for further "links" between the cured inner primary coating and the surface treated optical glass fiber, such as those previously only provided by adhesion promoters. Thus, preferably, the inner primary coating composition used is substantially-free of an adhesion promoter, which avoids many of the problems associated with the use of adhesion promoters.

Other additives which can be used in the inner primary or single coating composition include, but are not limited to, light sensitive and light absorbing components, catalysts, lubricants, wetting agents, antioxidants, stabilizers and photoinitiators. The selection and use of such additives is within the skill of the art.

Photoinitiators can be used in the inner primary or single coating composition. In conventional practice, photoinitiator is required for a UV cure, but is optional for an electron beam cure. However, in the present invention, because it is believed that free radicals may be generated on the surface of the optical fiber upon exposure to electron beam radiation, the radiation-curable functionality present in the inner primary or single coating composition may polymerize with reduced amounts of photoinitiator present. Hence, if desired, the amount of photoinitiator may be reduced to about 0.1% wt to about 2% wt, or more preferably to less than 1% wt. Alternatively, photoinitiator may not be required at all in some applications.

Use of the Electron Beam

This invention provides a very flexible method for easily and quickly adjusting the level of adhesion between the inner primary coating and the surface treated glass optical fiber. This adhesion can even be adjusted continuously as the coated, surface treated optical glass fiber is being produced on a drawing tower to provide many different levels of adhesion between the inner primary coating and the surface treated optical glass fiber. The electron beam exposure conditions can be varied to vary adhesion. For example, power, voltage, and amperage during beam exposure can be adjusted to suit the need.

Although a variety of factors may affect adhesion, the level of adhesion between the inner primary coating and the surface treated optical glass fiber is believed to be mainly dependent upon the following factors:

(1) the amperage level of electron beam radiation striking the surface of the optical glass fiber; and (2) the structure of the monomers and oligomers present in the inner primary coating composition.

In general, the greater the amperage level of electron beam radiation striking the surface of the optical glass fiber the greater the adhesion that is induced between the inner primary coating and the surface treated optical glass fiber. It is believed that the greater the amperage level of electron beam radiation striking the surface of the optical glass fiber the greater the quantity of free radicals generated on the surface of the surface of the fiber exposed to electron beam radiation. It is also believed that the quantity of free radicals on the surface of the treated optical glass fiber during curing of the inner primary coating is dependent upon the quantity of free radicals generated on the surface of the optical glass fiber during exposure to the electron beam radiation less the amount of free radicals which are scavenged by free radical scavengers or oxygen before curing the inner primary coating and less the amount of free radicals that reform the bonds that were broken on the surface of the surface treated optical glass fiber.

The exposure and amperage level of the electron beam radiation striking the optical glass fiber can be easily adjusted, including, but not limited to, the following:

(1) varying the amount of time the surface of the optical glass fiber is exposed to the electron beam radiation; and (2) varying the electron density of the electron beam radiation striking the surface of the optical glass fiber.

The amount of time the surface of the optical glass fiber is exposed to the electron beam radiation can easily be adjusted by varying the speed the optical glass fiber passing through the electron beam. In general, the faster the speed of the optical glass fiber, the lower the amperage level of the electron beam radiation striking the surface of the optical glass fiber and the less adhesion that is induced between the surface treated optical glass fiber and the inner primary coating (and apparently the less free radicals generated on the surface of the surface treated optical glass fiber).

The amperage level of the electron beam can be easily adjusted, for example, by adjusting the focus of the beam, electronically adjusting the amperage output of the electron beam, or by using filters.

Preferably, the amperage level of the electron beam radiation striking the optical glass fiber should be selected to provide the minimum amount of surface treatment required to induce the desired level of adhesion between the inner primary coating and the surface treated optical glass fiber, to reduce the possibility of damaging the optical glass fiber. If the voltage level of the electron beam striking the optical glass fiber is too high, permanently colored regions within the core of the surface treated optical glass fiber may be formed which can cause attenuation of the signal transmission through the surface treated optical glass fiber, or other undesirable effects.

Optical glass fibers have many different additives which can be affected by electron beam radiation. Thus, the amperage level of the electron beam radiation that is suitable will usually be dependent upon the specific optical glass selected. One skilled in the art will be enabled to test the selected optical glass fiber by exposure to different electron beam amperage levels to determine which amperage levels are suitable for the selected optical glass fiber, without undue experimentation.

The level of adhesion between the inner primary coating and the surface treated optical glass fiber may also be dependent upon the formulation of the inner primary composition. Inner primary coatings usually have a low equilibrium modulus. In general, a low equilibrium modulus is usually achieved by selecting monomers having fewer radiation-curable functional groups per volume unit. A low equilibrium modulus can also be achieved by reducing the concentration of the radiation-curable functional groups present in the inner-primary composition. Inner primary compositions having a lower concentration radiation-curable functional groups are believed to have fewer groups that can form "links" with the surface treated optical glass fiber, and/or apparently, with any free radicals present on the surface of the surface treated optical glass fiber. It is believed that the fewer the "links" between the inner primary coating and the surface treated optical glass fiber, the lower the level of adhesion between the inner primary coating and the surface treated optical glass fiber.

Furthermore, the different types of radiation-curable functional groups react differently in the presence of actinic radiation during curing. In general, those radiation-curable functional groups which are more reactive with free radicals in the presence of actinic radiation will result in greater adhesion between the inner primary coating and the surface treated optical glass fiber.

Based on the disclosure herein, one skilled in the art will be enabled to test the adhesion between the selected inner primary coating and the selected optical glass fiber to determine the optimum amperage level of the electron beam radiation needed to provide the desired adhesion, without undue experimentation.

To maximize the effect of the surface treatment (and apparently the quantity of free radicals present on the surface of the surface treated optical glass fiber during curing of the inner primary coating), the steps of exposing the surface of the optical glass fiber to electron beam radiation and applying the inner primary composition onto the surface treated optical glass fiber are preferably conducted in an atmosphere which is substantially free of free radical scavengers and oxygen. Examples of suitable atmospheres include inert gasses, such as nitrogen, neon, or argon gas.

The surface treatment of the surface treated optical glass fiber may become less effective with the passage of time. This may be due to the quantity of free radicals on the surface of the surface treated optical glass fiber being diminish by the reformation of bonds which were broken on the surface of the surface treated optical glass fiber. Thus, preferably the inner primary coating is applied and cured on the surface treated optical glass fiber as soon as possible after the surface of the optical glass fiber is exposed to electron beam radiation.

Because the adhesion between the inner primary coating to the surface-treated optical glass fiber is dependent upon the exposure and/or amperage level of the electron beam radiation, the adhesion can be continuously varied. For example, during drawing of the optical glass fiber, the moving uncoated optical glass fiber can be exposed to varying amperage levels of electron beam radiation to provide different levels of surface treatment on the optical glass fiber. In general, those sections of the surface treated optical glass fiber that have been exposed to greater amperage levels of electron beam radiation will result in more adhesion between the inner primary coating and the surface treated optical glass fiber, than those sections of the surface treated optical glass fiber that have been exposed to lower amperage levels of electron beam radiation. In this manner, the different levels of adhesion can be provided without stopping the fiber drawing process and changing the inner primary coating composition. For example, an undersea optical glass fiber can be easily provided with greater adhesion between the optical glass fiber and inner primary coating for those sections to be used under the deep sea, and the end sections can be provided with less adhesion between the optical glass fiber and the inner primary coating to facilitate ease of forming connections.

Another example of providing sections of the coated optical glass fiber with different levels of adhesion between the optical glass fiber and the inner primary coating, is to leave the end sections of the optical glass fiber untreated by electron beam and provide a sufficient amount of adhesion promoter in the radiation-curable, inner primary composition to provide a radiation-cured inner primary coating having strippability and sufficient adhesion to prevent delamination. The central section of the optical glass fiber can then be surface treated according to the present invention to provide enhanced levels of adhesion between the inner primary coating and the optical glass fiber.

The coated, surface treated optical glass fibers made according to this invention can be used in telecommunication systems. Such telecommunication systems typically include cables containing optical glass fibers, transmitters, receivers, and switches. The cables containing the optical glass fiber are the fundamental connecting units of telecommunication systems.

The coated, surface treated optical glass fibers made according to this invention can be adapted for enclosure within a cabled structure. The cabled structure can be buried under ground or water for long distance connections, such as between cities. Alternatively, the coated, surface treated optical glass fibers can be adapted for use in local area networks, such as for connecting offices in high rise buildings, residential subdivisions, and the like. Furthermore, the coated, surface treated optical glass fibers can be adapted for use in ribbon cable applications. One skilled in the art will be enabled to adapt the coated, surface treated optical glass fibers for the desired application. For example, such a person knows what level of adhesion is required between the inner primary coating and the optical glass fiber for the desired application. Based on the disclosure herein, such a person will be enabled to provide that required level of adhesion.

This invention also relates to a novel drawing tower which provides flexibility in providing different levels of adhesion between the inner primary coating and a surface treated optical glass fiber, while avoiding the undesirable necessity of stopping the fiber drawing process and changing the inner primary coating composition.

Figure 1:
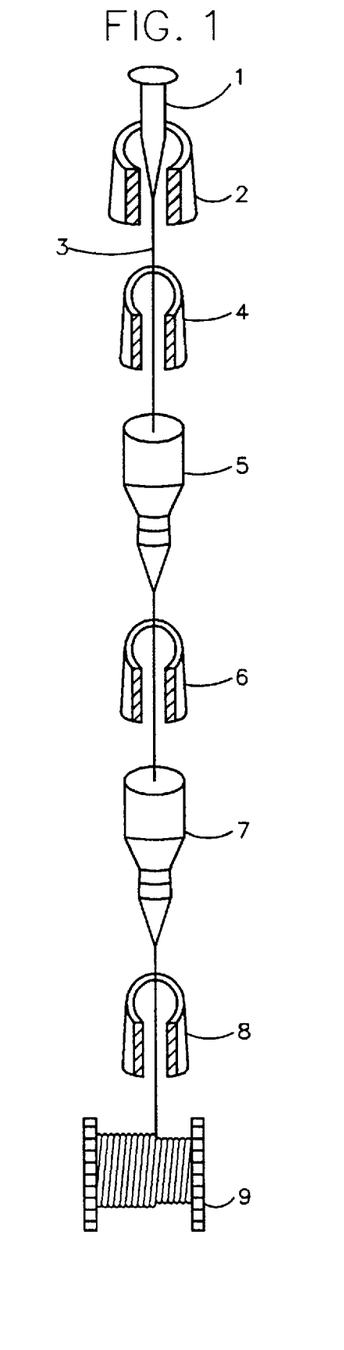
FIG. 1 is a schematic illustration of an optical glass fiber drawing tower which may be used in practicing the present invention.

FIG. 1 shows a schematic illustration of a drawing tower apparatus which can be used to practice the claimed invention. In FIG. 1, the preform shown at 1 is heated in the furnace shown at 2 to produce an uncoated optical glass fiber 3. The uncoated optical glass fiber 3 then passes through an electron beam generating apparatus shown at 4 to surface treat the bare optical glass fiber 3. The electron beam generating apparatus 4 preferably includes a controller (not shown) for controlling the amperage level and the voltage level of the electron beam. Then, an inner primary composition is applied to the surface treated bare optical glass fiber using the coating applicator shown at 5. The inner primary coating is cured by exposure to actinic radiation, which is shown at 6. An outer primary composition is then applied to the cured inner primary coating using the coating applicator shown at 7. The outer primary composition is cured by exposure to actinic radiation, shown at 8. The thus coated optical glass fiber is then wound by a takeaway, as shown at 9. The exposure and amperage level of the electron beam shown at 4 is preferably controllable to provide the desired exposure and amperage level of electron beam pretreatment to the optical glass fiber. Similarly, voltage and power levels are also controllable. Electron beam sources have been used by those skilled in the art to cure the coating compositions applied to optical glass fibers. Thus, one skilled in the art is familiar with the use of such electron beam sources. These same electron beam sources can be used to practice the claimed invention. For example, high energy, low voltage electron beam sources, such as Min-EB™, commercially available from American International Technologies, Torrence, Calif., can be used. Instead of applying the electron beam to cure a radiation-curable coating, the electron beam is now being used to surface treat the bare optical glass fiber. Thus, based on the disclosure herein, one skilled in the art will be enabled to modify known glass optical fiber drawing towers and move the electron beam source from downstream of the radiation-curable, coating composition applicators, to a location where the electron beam radiation can strike the bare optical glass fiber, as shown in FIG. 1. Such a person will also be enabled to select suitable power levels for the electron beam, based on the disclosure provided herein.

U.S. Pat. Nos. 4,522,148; 4,439,467; 4,324,575; 4,962,992; and Reissue Pat. No. 33,677 disclose suitable optical glass fiber drawing towers that can be modified according to this invention to provide for electron beam pretreatment. The disclosure of these patents is incorporated herein by reference.

While the invention has been described in detail and with reference to specific embodiments thereof, it will be apparent to those of ordinary skill in the art that various changes and modifications can be made therein without departing from the spirit and scope thereof.

What is claimed:

1. A method of increasing the adhesion of a radiation-cured coating contacting an optical glass fiber, said method comprising the combination of steps of:
   (1) exposing at least a section of an uncoated optical glass fiber to electron beam radiation to form an electron beam exposed optical glass fiber;
   (2) applying a radiation-curable coating composition onto said electron beam exposed optical glass fiber to form a coated optical glass fiber, said coating composition comprising at least one monomer or oligomer having a radiation-curable functional group which can form free radicals in the presence of actinic radiation; and
   (3) exposing said coated optical glass fiber to actinic radiation to thereby cure said coating.

2. A method according to claim 1, wherein step (1) is conducted in a manner to provide free radicals on said optical glass fiber surface and step (3) is conducted in a manner to provide free radicals in said radiation-curable coating composition.

3. A method according to claim 1, wherein said radiation-curable coating composition comprises a monomer or oligomer having an acrylate or methacrylate functionality.

4. A method according to claim 1, further comprising the step of drawing said optical glass fiber from a preform, and then conducting said steps (1) through (3) in a continuous process.

5. A method according to claim 1, wherein an amperage level of said electron beam radiation in step (1) is high enough to enhance bonding between said optical glass fiber and said radiation-cured coating, and a voltage level of said electron beam radiation is low enough to substantially prevent the formation of colored regions in said optical glass fiber.

6. A method according to claim 1, wherein said steps (1) through (3) are conducted in an atmosphere substantially free of free radical scavengers or oxygen.

7. A method according to claim 1, wherein said radiation-curable coating composition comprises photoinitiator in an amount of about 2% wt or less.

8. A method according to claim 1, wherein said radiation-curable coating composition comprises photoinitiator in an amount of about 1% wt or less.

9. A method according to claim 1, wherein said radiation-curable coating composition is substantially free of photoinitiator.

10. A method of varying the adhesion between an optical glass fiber and at least one radiation-cured coating contacting said optical glass fiber comprising the combination of steps of:
    (1) exposing a first section of an optical glass fiber to electron beam radiation having a first exposure level;
    (2) applying a first radiation-curable coating composition onto said first section of said optical glass fiber, said first radiation-curable coating composition comprising at least one monomer or oligomer having a radiation-curable functional group which can form free radicals in the presence of actinic radiation; and
    (3) exposing said first section of said optical glass fiber to actinic radiation to cure said first radiation-curable coating composition;
    (4) exposing a second section of said optical glass fiber to electron beam radiation having a second exposure level, said second exposure level being different from said first exposure level;
    (5) applying a second radiation-curable glass fiber coating composition onto said second section of said optical glass fiber, said second radiation-curable coating composition comprising at least one monomer or oligomer having a radiation-curable functional group which can form free radicals in the presence of actinic radiation; and
    (6) exposing said second section of said optical glass fiber to actinic radiation to cure said second radiation-curable coating composition,
    wherein said first and second sections of said optical fiber has a different level of adhesion to said coatings.

11. A method according to claim 10, wherein said steps (1) and (4) are conducted in such a manner to provide free-radicals on the surface of said optical glass fiber, and said steps (3) and (6) are conducted to provide free radicals in said coating composition.

12. A method according to claim 10, wherein said radiation-curable coating composition comprises a monomer or oligomer having an acrylate or methacrylate functionality.

13. A method according to claim 10, further comprising the step of drawing said optical glass fiber from a preform, and then conducting said steps (1) through (6) in a continuous process.

14. A method according to claim 10, wherein an exposure level of said electron beam in steps (1) and (4) is high enough to enhance bonding between said optical glass fiber and said first and second radiation-cured coating, and a voltage level of said electron beam radiation is low enough to substantially prevent the formation of colored regions in said optical glass fiber.

15. A method according to claim 10, wherein said steps (1) through (6) are conducted in an atmosphere substantially free of free radical scavengers or oxygen.

16. A method according to claim 10, wherein said first coating composition and said second coating composition are the same.

17. A method according to claim 10, wherein said first and second exposure levels are amperage levels.

18. A coated optical glass fiber having enhanced bonding of the coating contacting the optical glass fiber comprising:
an electron beam pre-treated optical glass fiber; and
a radiation-cured coating contacting said pre-treated optical glass fiber, wherein
said radiation-cured coating has been applied to said optical glass fiber in the form of a radiation-curable coating composition and cured by actinic radiation while said radiation-curable coating composition is contacting said optical glass fiber, and wherein
said radiation-cured coating exhibits enhanced bonding to said optical glass fiber as a result of exposure of said optical glass fiber to electron beam radiation before said radiation-curable coating composition is applied to said optical glass fiber.

19. A coated optical glass fiber according to claim 18, wherein said radiation-cured coating is substantially free of a glass coupling agent.

20. A coated optical glass fiber according to claim 18, wherein said radiation-curable coating composition is substantially free of a glass coupling agent.

21. A coated optical glass fiber according to claim 18, wherein said radiation-cured coating composition is substantially free of a silane glass coupling agent.

22. A coated optical glass fiber having varying amount of bonding of the coating contacting different sections of the optical glass fiber comprising:
a variable electron beam pre-treated optical glass fiber; and
a radiation-cured coating contacting said pre-treated optical glass fiber, wherein
said radiation-cured coating has been applied to said optical glass fiber in the form of a radiation-curable coating composition and cured by actinic radiation while said radiation-curable coating composition is contacting said optical glass fiber, and wherein
said radiation-cured coating exhibits enhanced bonding to said optical glass fiber as a result of exposure of said optical glass fiber to electron beam radiation before said radiation-curable coating composition is applied to said optical glass fiber, and wherein
the bonding between said coating and said optical glass fiber at different sections of said optical glass fiber is different.

23. A coated optical glass fiber according to claim 22, wherein said radiation-curable coating composition is substantially free of a glass coupling agent.

24. A coated optical glass fiber according to claim 22, wherein said radiation-curable coating composition is substantially free of a silane glass coupling agent.

25. An optical glass fiber cable according to claim 24, wherein said radiation-curable, optical glass fiber coating composition is substantially free of a glass coupling agent.

26. An optical glass fiber cable according to claim 25, wherein said radiation-curable composition is substantially free of a glass coupling agent.

27. An optical glass fiber cable comprising:
(1) a plurality of coated optical glass fibers containing at least one coated optical glass fiber comprising:
(i) an optical glass fiber having at least one section which has been surface treated by exposure to electron beam radiation at a level sufficient to induce bonding with a radiation-curable, optical glass fiber coating composition; and
(ii) a radiation-cured inner primary coating on said optical glass fiber, said radiation-cured inner primary coating being formed from said radiation-curable, optical glass fiber coating composition which has been suitably cured; and
(2) a sheath covering said plurality of optical glass fibers.

28. An optical glass fiber cable comprising:
(1) a plurality of coated optical glass fibers wherein at least one coated optical glass fiber comprises:
(i) an optical glass fiber having at least one section thereof which has been surface treated by exposure to electron beam radiation; and
(ii) a radiation-cured coating contacting said optical glass fiber, wherein said coating was applied to said fiber as a radiation-curable coating composition after said surface treatment and, in cured form, exhibits enhanced bonding to said fiber because of said surface treatment with said electron beam,
(2) a sheath covering said plurality of optical glass fibers.

29. A telecommunications system comprising:
at least one coated optical glass fiber having resistance to delamination caused by moisture, said coated optical glass fiber comprising:
an optical glass fiber having at least one section which has been surface treated by exposure to electron beam radiation at a level sufficient to induce bonding with a radiation-curable coating composition;
and a radiation-cured inner primary coating on said optical glass fiber which has been formed from said radiation-curable optical glass fiber coating composition;
at least one transmitter connected to said at least one optical glass fiber;
and at least one receiver connected to said at least one optical glass fiber.

30. A telecommunications system comprising:
at least one coated optical glass fiber comprising: an optical glass fiber having sections which have been surface treated by exposure to different amperage levels of electron beam radiation; and
a radiation-cured inner primary coating on said optical glass fiber which has been suitably cured, wherein said different sections of said coated optical glass fiber have different levels of adhesion between said radiation-cured inner primary coating and each section of said coated optical glass fiber;

at least one transmitter connected to said at least one optical glass fiber; and at least one receiver connected to said at least one optical glass fiber.

31. An optical glass fiber drawing tower for making a surface treated, optical glass fiber coated with an inner primary coating, said drawing tower being controllable to continuously adjust the adhesion of said inner primary coating to said surface treated optical glass fiber, said drawing tower comprising:

a device for heating a preform and providing an uncoated optical glass fiber;

a device for generating an electron beam for irradiating said uncoated optical glass fiber at a radiation level sufficient to induce subsequent bonding between said optical glass fiber and a radiation-curable, optical glass fiber coating composition;

a device for applying an uncured, radiation-curable, inner primary coating composition to said surface treated optical glass fiber;

a device for applying actinic radiation to said inner primary coating composition on said optical glass fiber to effect a curing thereof; and a device for taking-up and winding said coated optical glass fiber.

32. A drawing tower according to claim 31, further comprising a device for controlling the amperage level of said electron beam.

33. An optical glass fiber drawing tower including:

means for heating a preform and providing an uncoated optical glass fiber;

means for applying an uncured, radiation-curable, inner primary coating composition onto said optical glass fiber;

means for applying actinic radiation to said inner primary coating composition on said optical glass fiber to effect a curing thereof; and take-up means for winding said coated optical glass fiber; the improvement consisting essentially of including further means for generating an electron beam for irradiating said uncoated optical glass fiber at a radiation level sufficient to induce subsequent bonding between said optical glass fiber and a radiation-curable, optical glass fiber coating composition; and wherein said improved optical glass fiber drawing tower being controllable to continuously adjust the adhesion of said inner primary coating to said surface treated optical glass fiber.

34. A drawing tower according to claim 33, further comprising controller means for controlling the amperage level of said electron beam.

35. A coated glass article having resistance to coating delamination caused by moisture, said coated glass article comprising:

a glass article having at least one section which has been surface treated by exposure to an electron beam radiation at a level sufficient to induce bonding with a radiation-curable, glass coating composition;

and a radiation-cured coating on said glass article, said radiation-cured inner coating being formed from said radiation-curable, glass coating composition.

36. A method of increasing adhesion of a cured, radiation-curable coating composition to an optical glass fiber, comprising the steps of:

exposing an uncoated section of said optical glass fiber to radiation from an electron beam sufficient to induce bonding with said cured radiation-curable coating composition; and coating said section of said optical glass fiber with said radiation-curable coating composition.

37. The method according to claim 36, wherein said exposing step is conducted in a manner to provide free radicals on a surface of said optical glass fiber.

38. The method according to claim 36, wherein voltage of said electron beam is controlled to substantially prevent coloring said optical glass fiber.

39. The method of claim 36, wherein said exposing step is conducted in an atmosphere substantially free of free radical scavengers or oxygen.

40. A method of varying the adhesion between an optical glass fiber and a cured, radiation-curable coating composition in contact with said optical glass fiber comprising the steps of:

(1) treating a first section of an uncoated optical glass fiber with electron beam radiation at a first exposure condition sufficient to induce bonding with said cured, radiation-curable coating composition;

(2) treating a second section of said uncoated optical glass fiber with electron beam radiation at a second exposure condition sufficient to induce bonding with said cured, radiation-curable coating composition; and (3) coating said first and second sections of said optical glass fiber with said radiation-curable coating composition.

41. The method according to claim 40, wherein said treating steps are conducted in a manner to provide free-radicals on a surface of said optical glass fiber.

42. The method according to claim 40, wherein voltage of said electron beam radiation in said treating steps is controlled to substantially prevent coloring said optical glass fiber.

43. The method of claim 40, wherein said treating steps are conducted in an atmosphere substantially free of free radical scavengers or oxygen.

44. A coated optical glass fiber comprising:

an electron beam pre-treated optical glass fiber; and a radiation-cured coating contacting said pre-treated optical glass fiber, wherein said pre-treated optical glass fiber exhibits enhanced bonding of said radiation-cured coating.

45. The coated optical glass fiber according to claim 44, wherein said radiation-cured coating is substantially free of a glass coupling agent.

46. The coated optical glass fiber according to claim 44, wherein said radiation-cured coating is substantially free of a silane glass coupling agent.

47. A coated optical glass fiber comprising:

a variable electron beam pre-treated optical glass fiber; and a radiation-cured coating contacting said pre-treated optical glass fiber, wherein said pre-treated optical glass fiber exhibits enhanced bonding of said radiation-cured coating.

48. The coated optical glass fiber according to claim 47, wherein said radiation-cured coating is substantially free of a glass coupling agent.

49. The coated optical glass fiber according to claim 47, wherein said radiation-cured coating is substantially free of a silane glass coupling agent.

50. An optical glass fiber cable comprising:

a plurality of coated optical glass fibers wherein at least one coated optical glass fiber contains, an electron beam pre-treated optical glass fiber; and a radiation-cured coating contacting said pre-treated optical glass fiber;

wherein said pre-treated optical glass fiber exhibits enhanced bonding of said radiation-cured coating.

51. The optical glass fiber cable according to claim 50, wherein the coating of said at least one coated optical glass fiber is substantially free of a glass coupling agent.

52. A telecommunications system comprising:

at least one electron beam pre-treated optical glass fiber; and at least one radiation-cured coating contacting said pre-treated optical glass fiber, wherein said pre-treated optical glass fiber exhibits enhanced bonding of said radiation-cured coating.

53. The telecommunications system of claim 52, wherein:

said at least one electron beam pre-treated optical glass fiber has at least two sections which have been pre-treated by exposure to different electron beam radiation conditions.

54. An optical glass fiber drawing tower for making a surface treated, optical glass fiber coated with an inner primary coating comprising:

a device for generating an electron beam for sufficiently radiating an uncoated optical glass fiber to induce bonding with a cured inner primary coating;

and a device for applying said inner primary coating.

55. A drawing tower according to claim 54, further comprising a device for controlling amperage level of said electron beam.

56. A device for drawing optical glass comprising:

means for sufficiently surface treating an uncoated optical glass fiber with an electron-beam to induce bonding with a cured, radiation-curable coating composition; and means for applying said radiation-curable coating composition.

57. The device of claim 56, further comprising controller means for controlling amperage level of said electron beam.

58. A coated glass article comprising:

a glass article having at least one section which has been surface treated by exposure to electron beam radiation; and a radiation-cured coating adhered to said treated section of said glass article, wherein said surface treatment is sufficient to induce bonding of said radiation-cured coating.

* * * * *